United States Patent
Ueki et al.

(10) Patent No.: US 9,741,232 B2
(45) Date of Patent: Aug. 22, 2017

(54) PORTABLE DEVICE SEARCHING DEVICE, PORTABLE DEVICE SEARCHING METHOD, PORTABLE DEVICE SEARCHING PROGRAM

(71) Applicant: DENSO CORPORATION, Kariya, Aichi-pref. (JP)

(72) Inventors: Tatsuya Ueki, Kariya (JP); Shingo Takeuchi, Kariya (JP)

(73) Assignee: DENSO COPRORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/898,989

(22) PCT Filed: Jun. 12, 2014

(86) PCT No.: PCT/JP2014/003130
§ 371 (c)(1),
(2) Date: Dec. 16, 2015

(87) PCT Pub. No.: WO2014/203502
PCT Pub. Date: Dec. 24, 2014

(65) Prior Publication Data
US 2016/0125722 A1  May 5, 2016

(30) Foreign Application Priority Data
Jun. 19, 2013 (JP) .................... 2013-128660

(51) Int. Cl.
*G08B 21/24* (2006.01)
*B60R 25/24* (2013.01)
(Continued)

(52) U.S. Cl.
CPC .............. *G08B 21/24* (2013.01); *B60R 25/10* (2013.01); *B60R 25/245* (2013.01); *B60R 25/406* (2013.01)

(58) Field of Classification Search
CPC ....... G08B 21/24; B60R 25/406; B60R 25/10; B60R 25/40; B60R 25/403; H02J 13/0075
See application file for complete search history.

(56) References Cited

U.S. PATENT DOCUMENTS

2004/0196141 A1* 10/2004 Yoshida .............. H02J 13/0075
340/5.63
2007/0224967 A1* 9/2007 Kashiyama ......... B60R 25/2072
455/410
(Continued)

FOREIGN PATENT DOCUMENTS

JP      2007254962 A    10/2007
JP      2007259057 A    10/2007
(Continued)

OTHER PUBLICATIONS

International Search Report and Written Opinion (in Japanese with English Translation) for PCT/JP2014/003130, mailed Sep. 2, 2014; ISA/JP.

*Primary Examiner* — Nabil Syed
(74) *Attorney, Agent, or Firm* — Harness, Dickey & Pierce, P.L.C.

(57) ABSTRACT

A portable device searching device includes a transmitter that transmits search information to a search area near a vehicle to search for a portable device, a receiver that receives authentication information returned from the portable device as a response to the search information, and a controller that controls the transmitter and the receiver. The receiver includes an authentication portion to authenticate the portable device based on the authentication information and notifies the controller of an authentication result. The controller performs control to transmit the search information in a normal operation state, subsequently transitions to a low-power consumption state, and returns from the low- (Continued)

power consumption state to the normal operation state when notified of the authentication result from the receiver.

4 Claims, 4 Drawing Sheets

(51) Int. Cl.
*B60R 25/10* (2013.01)
*B60R 25/40* (2013.01)

(56) References Cited

U.S. PATENT DOCUMENTS

| 2008/0048846 | A1 | 2/2008 | Nagai et al. |
| 2010/0231354 | A1* | 9/2010 | Nishiguchi ............ H04L 63/08 340/5.8 |
| 2013/0063247 | A1* | 3/2013 | Blatz .................. G07C 9/00309 340/5.72 |

FOREIGN PATENT DOCUMENTS

| JP | 2008014095 A | 1/2008 |
| JP | 2008045374 A | 2/2008 |
| JP | 2008127913 A | 6/2008 |

* cited by examiner

PORTABLE DEVICE SEARCHING DEVICE, PORTABLE DEVICE SEARCHING METHOD, PORTABLE DEVICE SEARCHING PROGRAM

CROSS REFERENCE TO RELATED APPLICATIONS

This application is a U.S. National Phase Application under 35 U.S.C. 371 of International Application No. PCT/JP2014/003130 filed on Jun. 12, 2014 and published in Japanese as WO 2014/203502 A1 on Dec. 24, 2014. This application is based on and claims the benefit of priority from Japanese Patent Application No. 2013-128660 filed on Jun. 19, 2013. The entire disclosures of all of the above applications are incorporated herein by reference.

TECHNICAL FIELD

The present disclosure relates to a portable device searching device, a portable device searching method, and a portable device searching program to search for a vehicular portable device.

BACKGROUND ART

A publicly known technology (e.g., see patent literature 1) makes a search for a portable device such as a vehicular wireless key carried by a user by transmitting search information to a predetermined search area near a vehicle and receiving authentication information as a response from the portable device. The search for a portable device is periodically made at a time interval that takes into account a human travel speed in order to detect whether the user approaches or leaves the vehicle.

PRIOR ART LITERATURES

Patent Literature

Patent Literature 1: JP-2008-127913A

SUMMARY OF INVENTION

A battery mounted on the vehicle supplies the power for the search for the portable device. Periodically searching for the portable device consumes the battery power. For the purpose of power saving, when the number of occurrences to search for the portable device decreases, the search for the portable device may end before the user reaches the vehicle. Thus, with regard to the search for the portable device, it is demanded to save the power to economize battery power while ensuring the number of occurrences to search for the portable device.

The present disclosure has been made in consideration of the foregoing. It is an object of the present disclosure to provide a portable device searching device, a portable device searching method, and a portable device searching program capable of saving power without decreasing the number of occurrences to search for a portable device.

In an example of the present disclosure, a portable device searching device comprises a transmitter, a receiver and a controller. The transmitter transmits search information to a predetermined search area near a vehicle to search for a portable device carried by a user. The receiver receives authentication information returned from the portable device as a response to the search information. The controller controls the transmitter and the receiver. The receiver includes an authentication portion to authenticate the portable device based on the authentication information and notifies the controller of an authentication result when the authentication portion authenticates the portable device. The controller performs control to transmit the search information in a normal operation state, subsequently transitions to a low-power consumption state smaller than the normal operation state in power consumption, and returns from the low-power consumption state to the normal operation state when notified of the authentication result from the receiver.

In an example of the present disclosure, a portable device searching method comprises: a transmission step of transmitting search information to a predetermined search area near a vehicle to search for a portable device carried by a user; a transition step of, after the transmission step is performed, transitioning to a low-power consumption state smaller in power consumption than a normal operation state; and a return step of, when it is notified that the portable device responding to the search information is authenticated, returning from the low-power consumption state to the normal operation state.

In an example of the present disclosure, a portable device searching program causes a controller of a portable device searching device to perform a transmission process, a transition process and a return process. The portable device searching device comprises: a transmitter that transmits search information to a predetermined search area near a vehicle to search for a portable device carried by a user; a receiver that receives authentication information returned from the portable device as a response to the search information and notifies an authentication result of authenticating the portable device; and the controller that controls the transmitter and the receiver. In the transmission process, the controller transmits the search information with the transmitter. In the transition process, the controller transitions to a low-power consumption state smaller in power consumption than a normal operation state after performing the transmission process. In the return process, the controller returns from the low-power consumption state to the normal operation state when notified of the authentication result from the receiver.

According to the above portable device searching device, portable device searching method, and portable device searching program, it becomes possible to save power without decreasing the number of occurrences to search for a portable device.

EMBODIMENTS FOR CARRYING OUT INVENTION

Embodiments of the disclosure will be described with reference to the accompanying drawings. The mutually

First Embodiment

Figure 1:
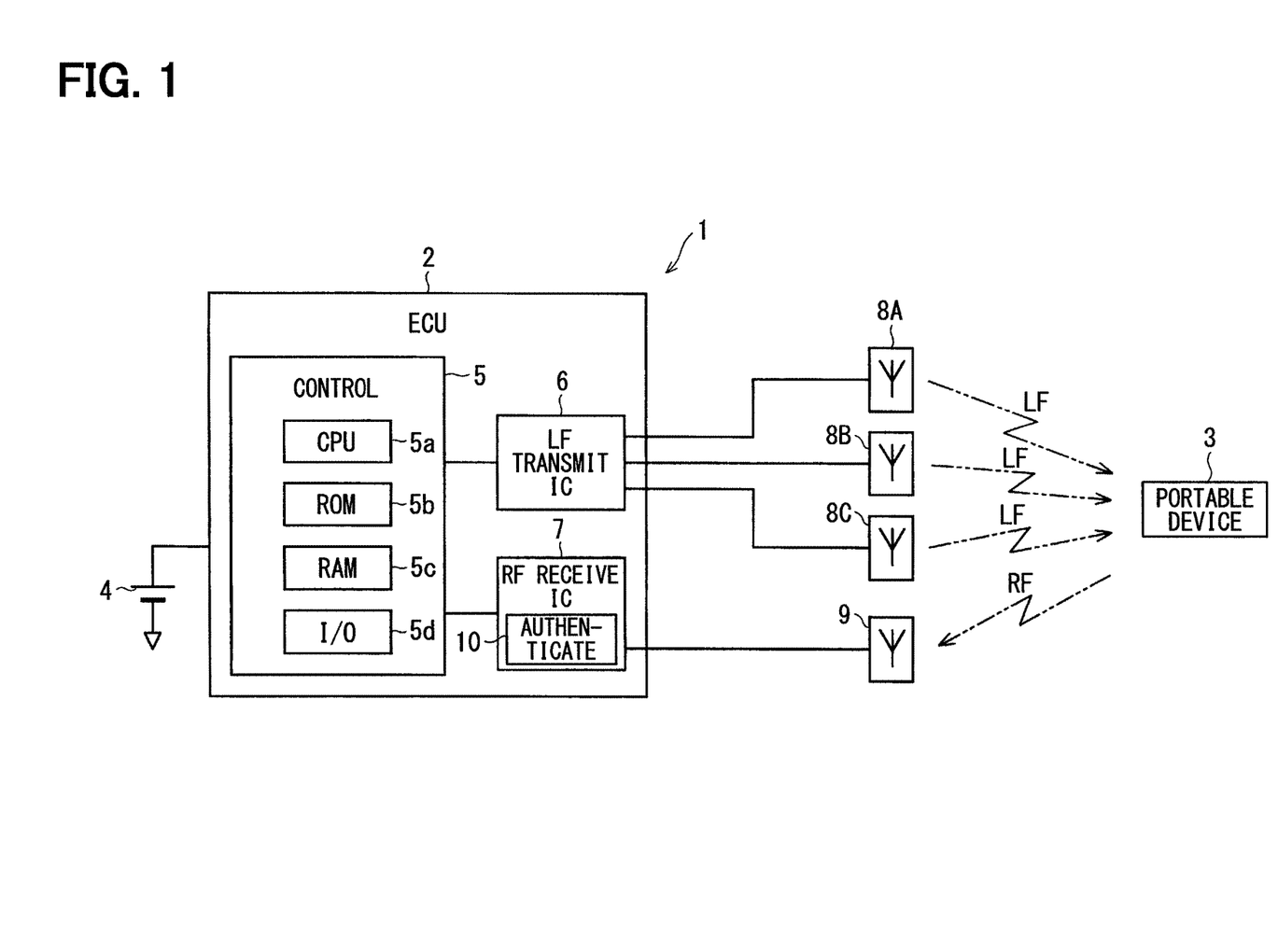
FIG. 1 is a diagram schematically illustrating a configuration of a searching device according to a first embodiment.

As illustrated in FIG. 1, a portable device searching device (hereinafter simply referred to as a searching device 1) mainly includes an ECU 2 (Electronic Control Unit). The searching device 1 performs wireless communication with a portable device 3 carried by a user to search for the portable device 3 near a vehicle. The searching device 1 detects whether or not the portable device 3 exists near the vehicle, namely, whether or not the user exists. When detecting the portable device 3 in a search area, the searching device 1 performs so-called a welcome operation such as unlocking a door or turning on hazard lights. The portable device 3 is provided as a small remote controller with a publicly known wireless communication function. The portable device 3 may have a function to start an engine as well as the function to lock or unlock the door. The process to search for the portable device 3 is performed even when an ignition switch is turned off. The searching device 1 operates on the power supplied from a battery 4 mounted on the vehicle.

The ECU 2 includes a controller 5, an LF transmission IC 6, and an RF reception IC 7. The controller 5 is configured as a microcomputer including a CPU 5a, ROM 5b, RAM 5c, and I/O 5d as an input/output interface. The controller 5 controls the ECU 2 as a whole according to a computer program stored in the ROM 5b. Specifically, the controller 5 controls transmission of an LF (low frequency) signal from the LF transmission IC 6. The LF signal uses a long-wave band frequency. As will be described in detail later, the controller 5 controls the welcome operation based on a result of authenticating the portable device 3 notified from the RF reception IC 7.

Figure 2:
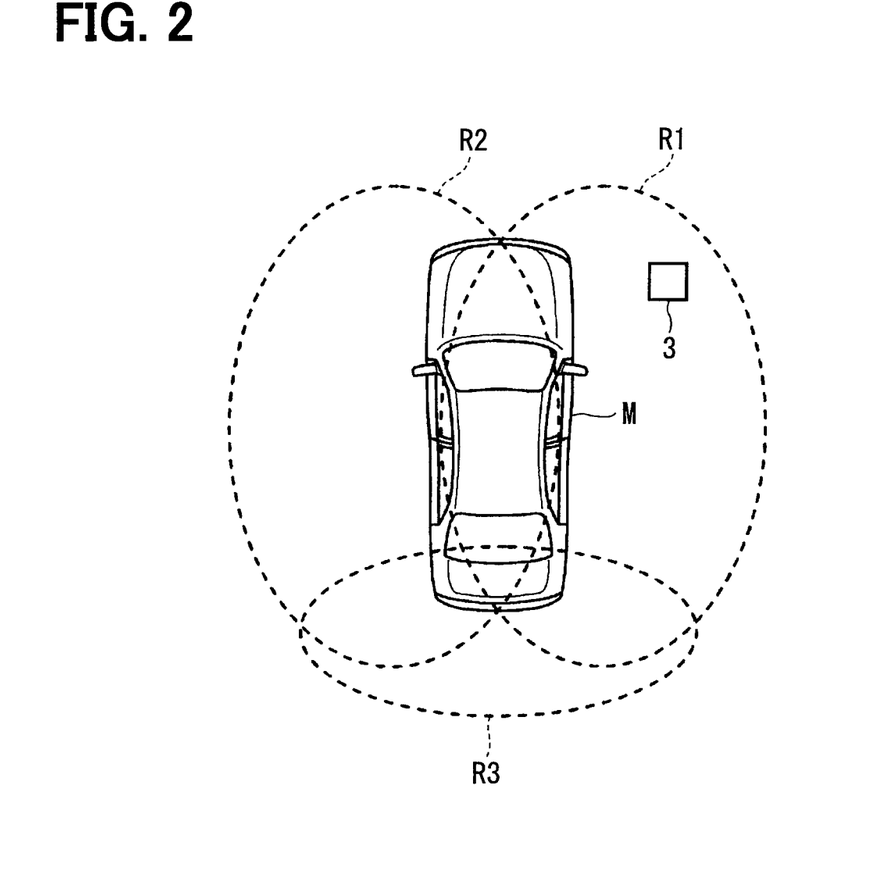
FIG. 2 is a diagram schematically illustrating predetermined search areas.

The LF transmission IC 6 includes a publicly known transmission circuit to generate the LF signal. According to the embodiment, the LF transmission IC 6 is connected to three transmission antennas 8A through 8C. The LF transmission IC 6 and the transmission antennas 8A through 8C constitute a transmitter. The transmission antennas 8A through 8C transmit LF signals. Information transmitted by the LF signal corresponds to search information to search for the portable device 3. As illustrated in FIG. 2, the transmission antennas 8A through 8C are provided correspondingly to three search areas R1 through R3 predetermined near vehicle M.

The transmission antenna 8A is provided at the right of vehicle M and corresponds to the search area R1 that approximately covers the entire length of vehicle M in the front-back direction. The transmission antenna 8B is provided at the left of vehicle M and corresponds to the search area R2 that approximately covers the entire length of vehicle M in the front-back direction. The transmission antenna 8C is provided at the rear of vehicle M and corresponds to the search area R3 that approximately covers the horizontal direction of vehicle M. The search area size is determined by adjusting the radio field strength of an LF signal as is well known.

The searching device 1 transmits the LF signal to the search areas R1 through R3 from the transmission antennas 8A through 8C, respectively. The portable device 3 returns an RF (radio frequency) signal as a response to the transmission antenna 8A when the portable device 3 exists in the search area R1 as illustrated in FIG. 2. The RF signal uses an ultrahigh frequency. Information transmitted by the RF signal corresponds to authentication information as a response from the portable device 3. The searching device 1 authenticates the portable device 3 based on the received RF signal to determine that the portable device 3 exists and determine in what search area the portable device 3 exits.

A reception antenna 9 is connected to the RF reception IC 7 as illustrated in FIG. 1 and receives the RF signal returned from the portable device 3. The RF reception IC 7 and the reception antenna 9 constitute a receiver. The RF reception IC 7 includes an authentication portion 10 and a publicly known reception circuit which demodulates the RF signal. The authentication portion 10 authenticates the portable device 3 based on the received RF signal (authentication information). A manner of authenticating portable device 3 may be a conventional manner and may be a publicly known technique used for the controller 5. For example, the portable device 3 may be authenticated by determining whether or not the received RF signal (authentication information) contains a unique ID predetermined for the portable device 3. When transmitting the LF signal, the controller 5 may register an ID of the targeted portable device 3 to the RF reception IC 7 and check whether the ID is contained in the authentication information.

The RF reception IC 7 of the embodiment includes the authentication portion 10 and therefore can perform a process that is conventionally performed by the controller 5 to identify the portable device 3. The RF reception IC 7 notifies the controller 5 of a result of authenticating the portable device 3, namely, the result indicating that the portable device 3 exists in the search area. Therefore, during a period after performing the process to transmit the LF signal and until notified of an authentication result from the RF reception IC 7, the controller 5 need not receive the RF signal nor authenticate the portable device 3 based on the received RF signal, unlike a conventional configuration.

Figure 3:
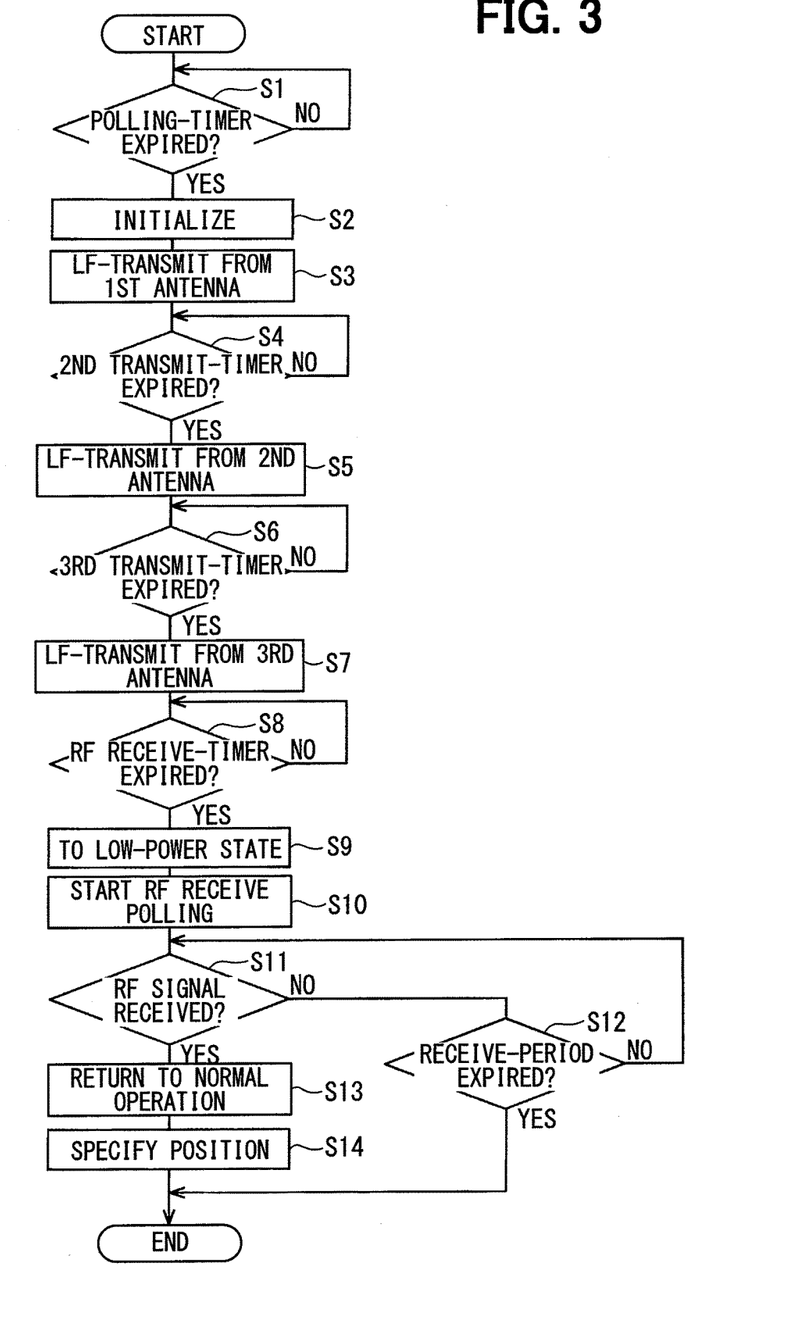
FIG. 3 is a diagram schematically illustrating a search process performed by the searching device.
Figure 4:
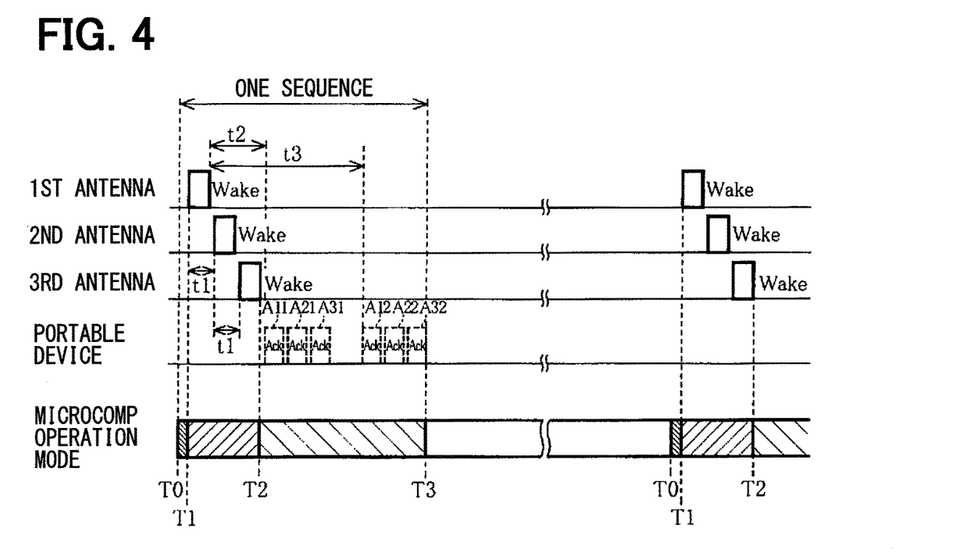
FIG. 4 is a diagram illustrating a search sequence in the searching device.

The following describes operations of the searching device 1 with reference to a search process flow illustrated in FIG. 3 and a search sequence illustrated in FIG. 4. For descriptive purposes, LF transmission in the following description signifies a process that causes the LF transmission IC 6 to transmit the LF signal.

The searching device 1 periodically performs the search process in FIG. 3. Specifically, the searching device 1 determines whether or not a polling timer has expired (S1). The searching device 1 waits if the polling timer has not expired (S1: NO). An interval to search for the portable device 3 is pre-set to the polling timer. The searching device 1 periodically searches for the portable device 3 each time the polling timer has expired.

When the polling timer has expired (S1: YES), the searching device 1 performs initialization (S2). At S2, the searching device 1 initializes a second transmission timer, a third transmission timer, and an RF reception timer, which will be described later. As illustrated in FIG. 4, the polling timer expires at time T0. The initialization is performed during a period between times T0 and T1. The controller 5 of the searching device 1 enters a standby state (wait state requiring the initialization) until time T0. After the initialization, normal operation state is set at time T1 and later. FIG. 4 schematically shows a microcomputer operation mode in such a way that the standby state is shown by no hatching pattern, and that the initialization, the normal operation state, and a low-power consumption state (wait state not requiring the initialization) are shown by different hatching patterns.

After the initialization is complete, the searching device 1 performs the LF transmission from the first antenna (transmission antenna 8A) as illustrated in FIG. 3 (S3). The first antenna transmits a Wake signal (LF signal) as illustrated in FIG. 4. The searching device 1 then determines whether or not the second transmission timer has expired (S4). A wait period until completion of the LF transmission from the first antenna is set to the second transmission timer. As illustrated in FIG. 4, transmission interval t1 is ensured after the first antenna transmits the Wake signal until the second antenna transmits the LF signal. This prevents LF signal interference.

When the second transmission timer has not expired (S4: NO), the searching device 1 waits until the second transmission timer has expired. When the second transmission timer expires (S4: YES), the searching device 1 performs the LF transmission from the second antenna (transmission antenna 8B) (S5). The searching device 1 determines whether or not the third transmission timer has expired (S6). When the third transmission timer has not expired (S6: NO), the searching device 1 waits until the third transmission timer has expired. When the third transmission timer has expired (S6: YES), the searching device 1 performs the LF transmission from the third antenna (transmission antenna 8C) (S7). The searching device 1 determines whether or not the RF reception timer has expired (S8). A wait period until completion of the LF transmission from the third antenna is set to the RF reception timer.

The searching device 1 according to the embodiment intermittently and uninterruptedly transmits LF signals to the search areas R1 through R3 at a time. The uninterrupted transmission signifies successive transmission of LF signals to the search areas without awaiting the authentication information returned from the portable device 3. Because of this, when starting the search process, the searching device 1 just needs to perform the initialization only once between times T0 and T1, where the time T0 is a time at which the polling timer has expired. The process and the step until transmission of the LF signals from the transmission antennas 8 correspond to a transmission process and a transmission step.

For allowing the intermittent transmission of LF signals, the portable device 3 is configured so that the completion of the transmission of all LF signals is followed by a response period (response from the portable device 3) during which the portable device 3 returns the RF signal in response to receipt of the LF signal. As illustrated in FIG. 4, the portable device 3 is configured so that period t2 or t3 until returning an Ack signal (RF signal) follows time T2, where the time T2 is a time after the completion of the LF transmission. Period t2 is a response period predetermined for the portable device 3 that the user mainly uses. Period t3 is a response period predetermined for the portable device 3 that is used as a backup (spare). More response periods may be provided or only period t2 may be provided depending on the number of backup devices.

In FIG. 4, Ack signal A11 or A12 is a response to the LF signal transmitted from the first antenna. Ack signal A21 or A22 is a response to the LF signal transmitted from the second antenna. Ack signal A31 or A32 is a response to the LF signal transmitted from the third antenna. The portable device 3 chronologically and successively returns the Ack signals in response to intermittent transmission of the LF signals. In this regard, by identifying the time to return the Ack signal, it is possible to determine to which LF transmission the response corresponds. In other words, even when the uninterrupted LF transmission is employed, it is possible to determine in which search area the portable device 3 exists.

After completing all the LF transmissions, the controller 5 of the searching device 1 transitions to the low-power consumption state (S9). The process and the step at S9 correspond to a transition process and a transition step. Now, it is assumed that the controller 5 transitions to the low-power consumption state at time T2 as shown in FIG. 4.

The RF reception IC 7 receives the RF signal from the portable device 3 and authenticates the portable device 3. Specifically, the RF reception IC 7 receives the Ack signal (RF signal) in FIG. 4, authenticates the portable device 3 based on the Ack signal, and determines to which LF transmission the response corresponds. When the RF reception IC 7 receives any Ack signal and finishes authenticating the portable device 3, the RF reception IC 7 then notifies an authentication result to the controller 5. As illustrated in FIG. 4, the controller 5 remains in the low-power consumption state at time T2 and later as long as no authentication result is notified from the RF reception IC 7.

After transition to the low-power consumption state, the searching device 1 determines whether or not the RF signal is received (S11) and determines whether or not the reception period has expired (S12), as illustrated in FIG. 3. When both determinations are negated (S11: NO and S12: NO), the searching device 1 waits, the process at S11 determines whether or not the RF signal is received from the portable device 3. When viewed from the controller 5, the process at S11 determines whether or not an authentication result is notified from the RF reception IC 7.

When the RF signal is received (S11: YES), the searching device 1 returns to the normal operation state (S13). Specifically, when an authentication result is notified from the RF reception IC 7 the searching device 1 in the low-power consumption state returns to the normal operation state. The process and the step to return to the normal operation state correspond to a return process and a return step. The searching device 1 specifies the position of the portable device 3 based on the notified authentication result (S14).

After specifying the position of the portable device 3, the searching device 1 terminates the search process in FIG. 3 and performs predetermined operation or control corresponding to the position of the portable device 3. Specifically, when the searching device 1 newly detects the existence of the portable device 3, the searching device 1 performs the welcome operation such as unlocking a door or turning on hazard lights. The searching device 1 may operate in cooperation with other ECUs such as a body ECU rather than standalone operation. For example, when the portable device 3 exists in the search area R1, the searching device 1 can turn on only a right lamp or increase the brightness of only the right lamp. In one configuration, when the portable device 3 exists in the search area R1, the searching device 1 may disable the LF transmission to the search area R1. A reason for this configuration is as follows. Because the portable device 3 returns the RF signal in response to the LF transmission, the portable device 3 may continuously respond to the LF transmission even though the position is specified. This degrades battery life. To avoid this, when the position is specified, no LF signal is transmitted to the corresponding search area. This can prevent the battery life of the portable device 3 from decreasing. This can also economize the power of the battery 4 of the vehicle because no LF transmission is performed.

When the reception period has expired while no RF signal is received (S11: NO and S12: YES), the searching device 1 terminates the process. Specifically, upon expiration of a maximum response time (a period up to time T3 in FIG. 4) for a response from the targeted portable device 3, one sequence terminates. It is noted that because the search process in FIG. 3 is repeatedly performed, the search process substantially returns to S1 after the search process terminates even as a result of S14.

In the searching device 1 according to the embodiment, the controller 5 can transition to the low-power consumption state after the LF transmission. Further, because no authentication result is notified if the portable device 3 does not exist in any search area, the controller 5 can await the next sequence while maintaining the low-power consumption state.

The embodiment can provide the following technical effects.

In the searching device 1, the RF reception IC 7 includes the authentication portion 10 which authenticates the portable device 3 and which notifies an authentication result to the controller 5. Because of this, after controlling the LF transmission, the controller 5 of the searching device 1 need not perform substantive processes until notified of the authentication result from the RF reception IC 7. Therefore, after the LF transmission, the controller 5 can transition to the low-power consumption state and can reduce the power consumption.

The searching device 1 reduces the power consumption for each search sequence. Therefore, there is no need to decrease the number of search sequences. The power consumption can be reduced without decreasing the number of occurrences to search for the portable device 3.

When multiple search areas are set, the searching device 1 intermittently and uninterruptedly performs the LF transmission to the search areas. Because of this, even when the several search areas are set, the search sequence is performed once and consequently the initialization process is performed once. This can reduce the power consumption needed for the initialization process, as compared with a conventional configuration that performs the initialization processes for respective search areas.

The RF reception IC 7 includes the authentication portion 10. This allows the controller 5 to transition to the low-power consumption state after performing the transmission step of transmitting the LF signal to the search area. Therefore, the power consumption when the controller 5 is awaiting a response from the portable device 3 can be reduced. The controller 5 maintains the low-power consumption state until an authentication result is notified though the controller 5 returns to the normal operation state at the return step when notified of an authentication result from the RF reception IC 7 and performs specified operation. This can prevent unnecessary standby power consumption when the portable device 3 does not exist in the search area. The portable device searching method including the transmission step, the transition step, and the return step enables power saving without decreasing the number of occurrences to search for the portable device 3.

A portable device searching program causes the controller 5 to perform the transmission process, the transition process, and the return process and thereby provides the same technical effect as the portable device searching method.

The above-described technical effects, such as performing the initialization process once etc., are also available by executing a program for intermittently and uninterruptedly transmitting the search information to all the predetermined search areas in the transmission step or for intermittently and uninterruptedly transmits the search information in the transmission process.

Other Embodiments

The embodiments of the disclosure are not limited to those described above. It is further understood by those skilled in the art that various modifications and expansions may be made in the disclosure without departing from the spirit and scope thereof.

Figure 5:
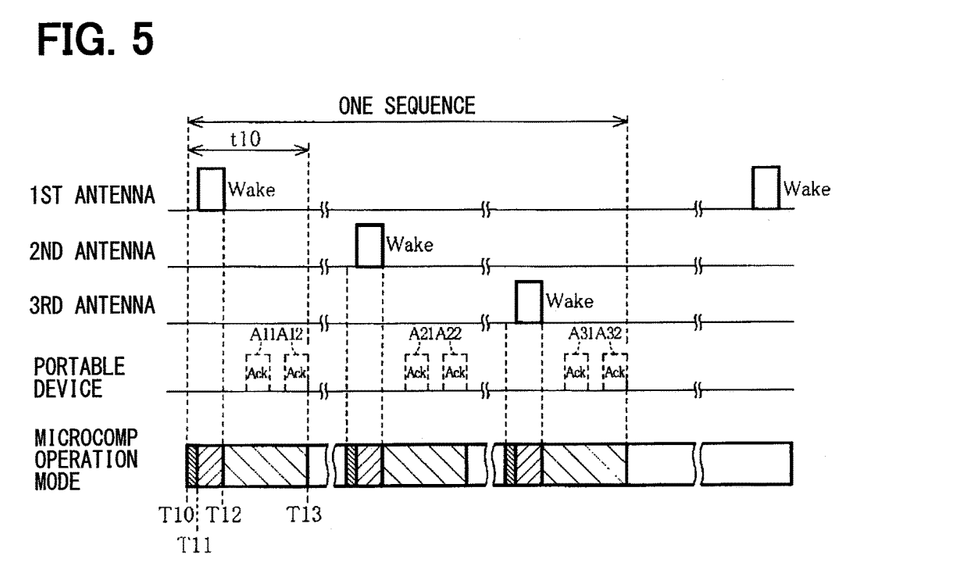
FIG. 5 is a diagram illustrating a search sequence according to another embodiment.

The first embodiment provides the example of intermittently and uninterruptedly transmitting the search information to all the predetermined search areas. However, the disclosure is not limited this. FIG. 5 illustrates that the search process is performed for each of the antennas. Also in this case, the same technical effect as in the first embodiment is available by providing the RF reception IC 7 with the authentication portion as illustrated in FIG. 1 and performing the search process as illustrated in FIG. 3. Specifically, after the LF transmission (transmitting the Wake signal), the controller 5 may transition to the low-power consumption state at time T12 and later. In such a case, the power consumption can be reduced as compared with a conventional configuration in which the normal operation state continues up to time T13 (the normal operation state period is T10). In other words, when multiple search areas are set, the search process may be separately performed for respective search areas.

The number of transmission antennas 8, the number of search areas, and the search area size described in the embodiments are examples and are not limited thereto.

In the first embodiment, the process at S14 specifies the position of the portable device 3. Alternatively, the process may only detect the existence of the portable device 3 without specifying the position.

Operations that follow the process of specifying the position of the portable device 3 or detecting the presence of the portable device 3 are not limited to those described in the embodiments but may be changed as needed. For example, suppose that a door is unlocked when the user leaves the vehicle and the portable device 3. In such a case, the searching device 1 may perform operation such as turning on hazard lights to capture user's attention. The operation after detection of the portable device 3 can be specified optionally depending on situations in which the user may be approaching, may be leaving, and may continue to stay in a search area.

While there have been described specific embodiments and configurations of the present disclosure, it is to be understood that the embodiments and configurations of the disclosure are not limited to those described above. The scope of embodiments and configurations of the disclosure also covers an embodiment or a configuration resulting from appropriately combining technical elements disclosed in different embodiments or configurations.

What is claimed is:

1. A portable device searching device comprising:
a transmitter that, during a predetermined successive transmission time period chronologically and successively transmits search information to each of a plurality of predetermined search areas near a vehicle to search for at least one portable device carried by at least one user;
a receiver that receives authentication information returned from the portable device as a response to the search information; and
a controller that controls the transmitter and the receiver, wherein:
the receiver includes an authentication portion to authenticate the at least one portable device based on the authentication information and notifies the controller of an authentication result when the authentication portion authenticates the at least one portable device;

the controller
performs control to chronologically and successively transmit the search information to each of the plurality of predetermined search areas in a normal operation state, the controller being kept in the normal operation state during the predetermined successive transmission time period during which the search information is chronologically and successively transmitted from the transmitter to the predetermined search areas,
subsequently transitions from the normal operation state to a low-power consumption state state, the low-power consumption state having less power consumption than the normal operation state, and
returns from the low-power consumption state to the normal operation state when notified of the authentication result from the receiver;
the at least one portable device includes a first portable device and a second portable device separate from each other and different from each other in a response time period, the response time period being defined as a time period from a time of receiving a respective search information to a time of returning the authentication information as the response to the respective search information;
the response time period of the first portable device and the response time period of the second portable device are set so that at different times, the receiver receives the authentication information from the first portable device and the authentication information from the second portable device as the response to the respective search information;
the predetermined successive transmission time period is shorter than a smaller one of the response time periods of the first and second portable devices, and the controller transitions to the low-power consumption state subsequently to the successive transmission time period; and
the controller transitions from the normal operation state to the low-power consumption state before elapse of the smaller one of the response time periods of the first and second portable devices since the start of the predetermined successive transmission time period.

2. A portable device searching method comprising:
transmitting search information during a predetermined successive transmission time period chronologically and successively to each of a plurality of predetermined search areas near a vehicle, in a normal operation state, to search for at least one portable device carried by at least one user, and remaining in the normal operation state during the predetermined successive transition time period during which the search information is chronologically and successively transmitted from the transmitter to the predetermined search areas;
after transmitting the search information, transitioning to a low-power consumption state, the low-power consumption state having less power consumption than the normal operation state; and
when it is notified that the portable device responding to the search information is authenticated, returning from the low-power consumption state to the normal operation state; wherein
the at least one portable device includes a first portable device and a second portable device separate from each other and different from each other in a response time period, the response time period being defined as a time period from a time of receiving a respective search information to a time of returning the authentication information as the response to the respective search information;
the response time period of the first portable device and the response time period of the second portable device are set so that at different times, the receiver receives the authentication information from the first portable device and the authentication information from the second portable device as the response to the respective search information; and
the predetermined successive transmission time period is shorter than a smaller one of the response time periods of the first and second portable devices, and the controller transitions to the low-power consumption state subsequently to the successive transmission time period;
the portable device searching method further comprising transitioning from the normal operation state to the low-power consumption state before elapse of the smaller one of the response time periods of the first and second portable devices since the start of the predetermined successive transmission time period.

3. A non-transitory storage medium storing a portable device searching program for a portable device searching device including: a transmitter that during a predetermined successive transmission time period chronologically and successively transmits search information to each of a plurality of predetermined search areas near a vehicle to search for at least one portable device carried by at least one user; a receiver that receives authentication information returned from the portable device as a response to the search information and notifies an authentication result of authenticating the at least one portable device; and a controller that controls the transmitter and the receiver,
the portable device searching program causing the controller to perform:
chronologically and successively transmitting the search information with the transmitter to each of the plurality of predetermined search areas in a normal operation state, the controller being kept in the normal operation state during the predetermined successive transmission time period during which the search information is chronologically and successively transmitted from the transmitter to the predetermines search areas;
transitioning from the normal operation state to a low-power consumption state, the low-power consumption state having less power consumption than the normal operation state after transmitting the search information; and
returning from the low-power consumption state to the normal operation state when notified of the authentication result from the receiver; wherein
the at least one portable device includes a first portable device and a second portable device separate from each other and different from each other in a response time period, the response time period being defined as a time period from a time of receiving a respective search information to a time of returning the authentication information as the response to the respective search information;
the response time period of the first portable device and the response time period of the second portable device are set so that at different times, the receiver receives the authentication information from the first portable device and the authentication information from the second portable device as the response to the respective search information;

the predetermined successive transmission time period is shorter than a smaller one of the response time periods of the first and second portable devices, and the controller transitions to the low-power consumption state subsequently to the successive transmission time period; and the controller transitions from the normal operation state to the low-power consumption state before elapse of the smaller one of the response time periods of the first and second portable devices since the start of the predetermined successive transmission time period.

4. The portable device searching device of claim 1, wherein in response to the notification of the authentication result when the authentication portion authenticates the at least one portable device, the controller performs at least one of unlocking a door of the vehicle or turning on hazard lights of the vehicle.

\* \* \* \* \*